Oct. 21, 1941.　　S. G. BAITS ET AL　　2,260,132
INTERNAL COMBUSTION ENGINE
Filed April 22, 1938　　2 Sheets-Sheet 1
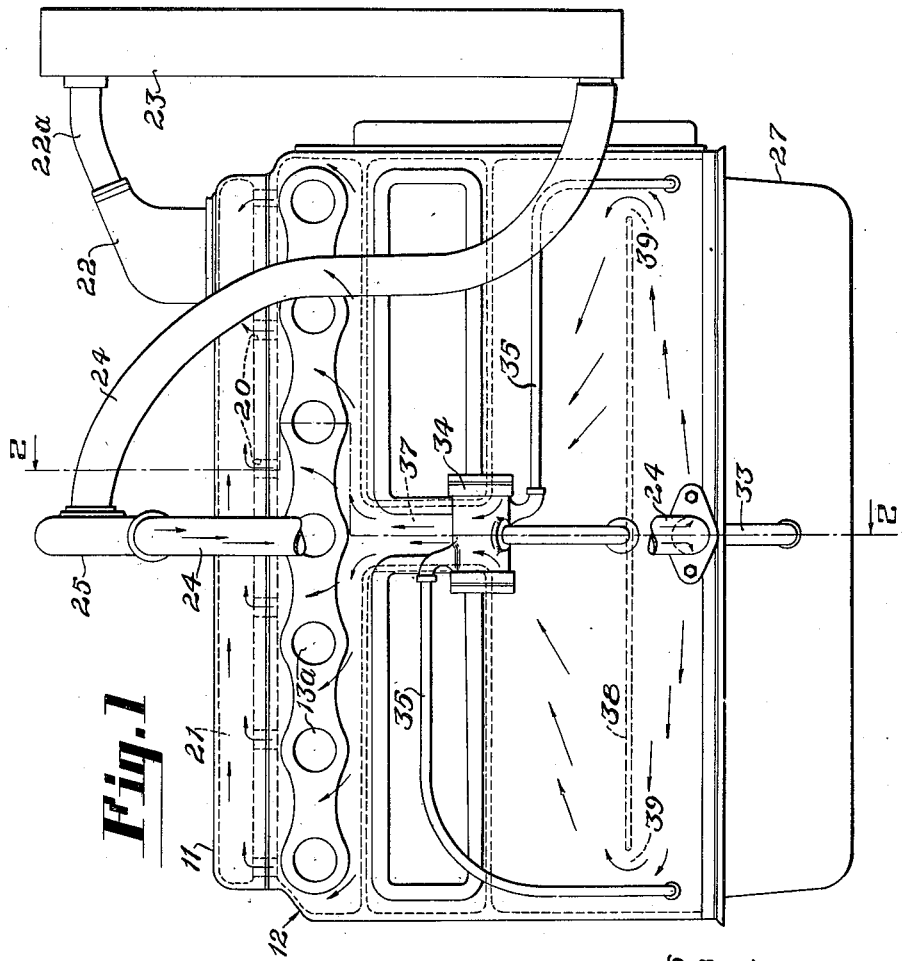
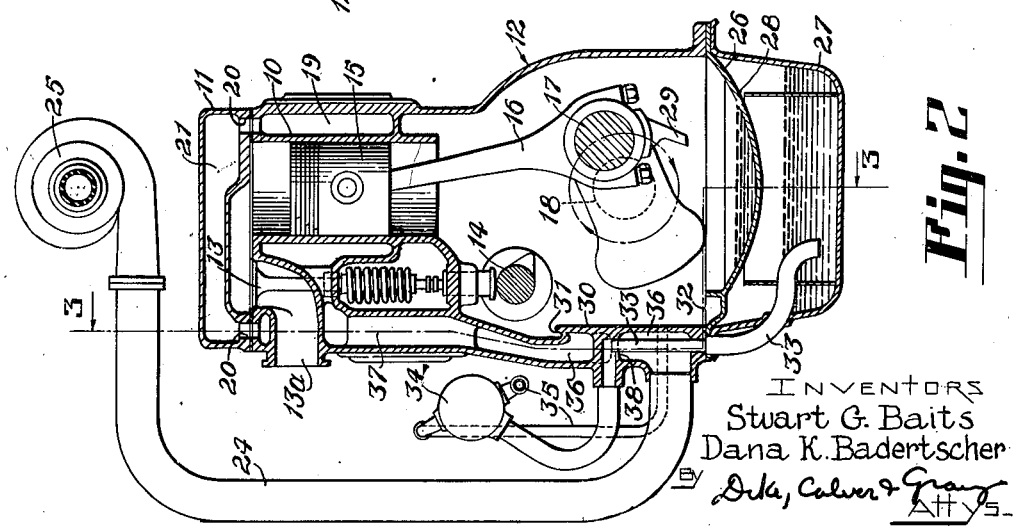
INVENTORS
Stuart G. Baits
Dana K. Badertscher Patented Oct. 21, 1941

2,260,132

UNITED STATES PATENT OFFICE 2,260,132

INTERNAL COMBUSTION ENGINE

Stuart G. Baits and Dana K. Badertscher, Grosse Pointe Park, Mich., assignors to Hudson Motor Car Company, Detroit, Mich., a corporation of Michigan Application April 22, 1938, Serial No. 203,652

11 Claims. (Cl. 123—196)

This invention relates to internal combustion engines and particularly to such engines which are cooled by a liquid medium, an object of the invention being to provide improved and relatively simple, economical and efficient means for controlling the temperature of the lubricating oil through the medium of the liquid cooling medium.

As is well known in the operation of an internal combustion engine, the heat of combustion as well as that of friction tends to raise the temperature of the oil used to lubricate the various working parts, and under certain load and weather conditions the oil may become so hot as to threaten the integrity of the bearings and materially reduce the life thereof. It is, therefore, the goal of every engine designer and operator to keep the oil temperature as low as possible. To this end, various types of special oil cooling devices have been designed, but such devices have been complicated and expensive and have included cumbersome parts which objectionably obstruct the accessibility of other parts of the engine.

The present invention has for its object to eliminate the necessity of special oil cooling devices and, at the same time, to maintain the temperature of the oil within desirably low limits even under the most adverse operating conditions. With this end in view, the invention contemplates the cooling of the oil by the regular engine cooling system whereby the results in question can be accomplished.

A further object of the invention is to provide improved means for cooling the lubricating oil of the engine by extending the cooling jacket to the lower portion of the crankcase and causing the cooling liquid to flow along the crankcase wall against which the lubricating oil is thrown by the motion of the connecting rods and crankshaft.

Still a further object is to cause the cooling liquid to flow along the wall of the crankcase in a direction counter to the flow or movement of the oil on the opposite side of said wall.

Another object of the invention is to cool the lubricating oil, flowing through the pipe or conduit to or from the oil pump, through the medium of the cooling liquid delivered to the engine from the circulating pump.

The above and other objects of the invention will appear from the following description and appended claims when considered in connection with the accompanying drawings forming a part of this specification.

In said drawings:

Fig. 1 is a side elevation, partly broken away, of the complete power plant.

Fig. 2 is a transverse section taken generally on the line 2—2, Fig. 1, but with some offsetting at certain points in the interest of clearness of illustration.

Figure 3:
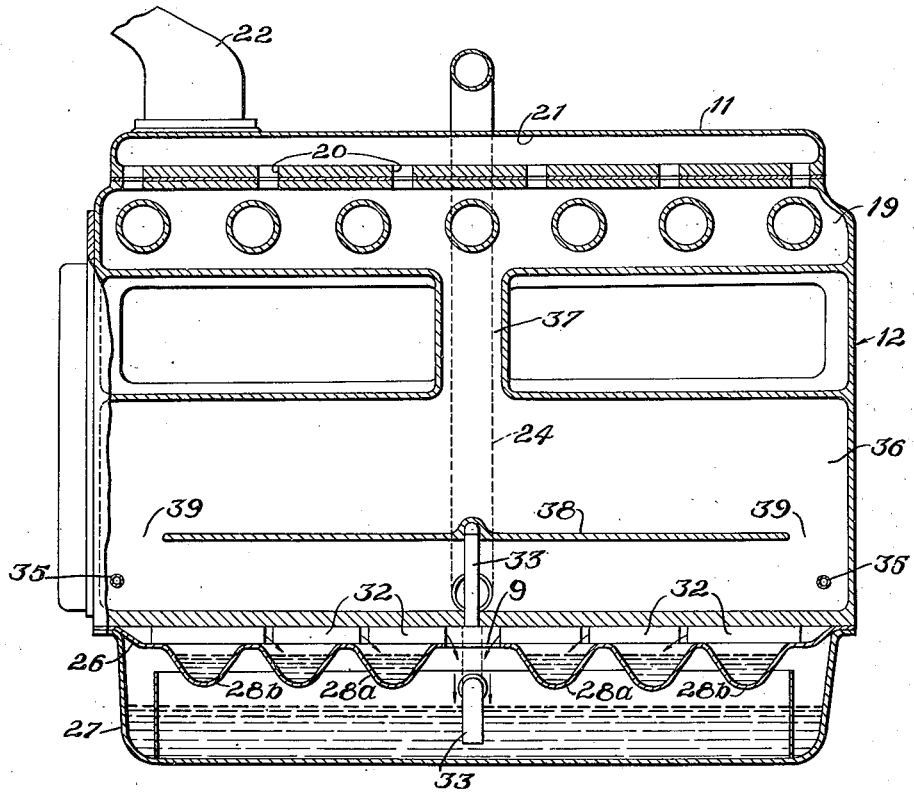
Fig. 3 is a section taken substantially on the line 3—3, Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is herein illustrated as applied to an internal combustion engine of conventional type having a plurality (herein 6) of working cylinders 10 disposed with their axes in a common plane, a cylinder head 11 above the cylinders, a crank case 12 below the cylinders, inlet and exhaust valves 13 for the several cylinders controlling inlet and exhaust passages 13a and being operated by a cam shaft 14 driven conventionally from the engine, and pistons 15 in the several cylinders connected respectively by connecting rods 16 with cranks 17 on a crank shaft 18 which is journalled in suitable bearings in the crankcase 12. As thus far described, the engine may be of any conventional or well-known construction and is therefore not illustrated fully or in detail herein.

The engine is provided with a cooling system for circulating a suitable cooling fluid, for example, water, said system comprising a cooling jacket 19 about the cylinders 10, valves 13 and passages 13a, said jacket communicating through ports 20 with a cooling space or jacket 21 in the head 11, a header 22 and hose connection 22a leading from the jacket 21 to the top of a radiator 23, and a return conduit 24 leading from the bottom of the radiator 23 and communicating with the lower part of the cooling jacket, said conduit including a suitable circulating pump 25 driven from the engine. Except as hereinafter pointed out, the cooling system may likewise be of the conventional form and arrangement familiar to those skilled in the art.

The engine is likewise provided with a lubricating system which, generally speaking, as herein shown is similar to the system described in the Northrup Patent No. 1,959,687, May 22, 1934. Said system includes an oil tray 26 beneath the crankcase 12 and an oil reservoir 27 beneath the oil tray. The oil tray 26 is formed with transversely extending depressions 28 which serve as troughs in which the oil collects. The depressions are equal in number to the cranks 17 and are so positioned that fingers or dippers 29 on the ends of the connecting rods 16 will splash oil from the several troughs against a wall 30 of the crankcase. Oil will also be forced by inertia from the dippers 29 into the connecting rod bearings and around the crank pins. The wall 30 is provided with a gutter 31 by which oil striking said wall above said gutter and collecting therein flows by gravity into the crankshaft bearings of the engine in a manner not shown. Attached to the oil tray 26 at the ends of the respective troughs are conveyors or baffles 32 which may be arranged substantially like those in the beforementioned Northrup patent so that oil splashed from each trough upon the wall 30 will be prevented from returning to that trough and will be forced or caused to flow into the trough lying next adjacent thereto in the direction of the longitudinal center of the engine. The baffles 32 corresponding to the troughs 28a adjacent and at opposite sides of said longitudinal center are arranged to discharge oil through an opening 9 in the tray and into the reservoir 27. The arrangement is such that the oil travels progressively from the endmost troughs 28b to the troughs 28a and thence to the reservoir, being splashed progressively against different parts of the wall 30 from the outer ends to the center of the engine. From the reservoir 27, the oil is drawn through a conduit 33 by an engine-driven oil pump 34 and delivered thereby through conduits 35 to the endmost troughs 28b.

In accordance with the present invention, the cooling jacket 19 is formed with a downward extension 36 communicating therewith through a passage 37, said extension being substantially coextensive with the wall 30 and disposed at the outer side thereof. The return conduit 24 of the cooling system communicates with the lower end of the jacket extension 36, which is divided by a horizontal partition 38 the ends of which are, however, spaced from the end walls of said jacket extension to provide flow passages 39. The cooling fluid returned from the radiator 23 to the engine by the pump 25 enters the jacket extension 36 below the partition 38 and thence flows outwardly towards the ends of the engine beneath said partition, thence through the passages 39, thence inwardly toward the center of the engine, thence upwardly through the passage 37 to the jacket 19, thence through the ports 20 into the head jacket 21 from which it is returned to the radiator through the header 22 and hose connection 22a. The oil conduit 33 passes through that portion of the jacket extension 36 which is below the partition 38 and thence outwardly to the oil pump 34. Consequently, the oil drawn through said conduit 33 from the reservoir 27 is subjected to the influence of the cooling fluid in the jacket extension at the coolest part of the system. Also, since the oil is splashed upon the crankcase wall 30 progressively from the outer ends of the engine toward the center, being progressively heated as it advances, and since the cooling fluid entering the jacket extension 36 flows in contact with said wall below the partition 38 outwardly from the center toward the ends of the engine in opposition to the direction of travel of the oil, it will be seen that the coolest part of the cooling fluid is opposite that portion of the wall which tends to be most highly heated by the splashing oil, thereby maintaining said wall, and consequently the advancing oil, at a substantially uniformly low temperature, so that tendency of the oil to become overheated is resisted throughout.

We claim:

1. An internal combustion engine having cylinders; a crank case; a crank shaft; means actuated by rotation of said crank shaft to splash lubricant in the crank case against a wall of the latter; a cooling jacket about the cylinders, said jacket having an extension for cooling said wall; and a lubricating system including a conduit through which lubricant circulates, said conduit extending through said jacket extension.

2. An internal combustion engine having cylinders; a crank case; a crank shaft; means responsive to rotation of said crank shaft to cause lubricant in the crank case to be splashed against a wall of the latter; a cooling system including a cooling jacket about said cylinders, said jacket having an extension disposed opposite said wall, a heat exchanger outside said jacket, and a device for circulating a cooling medium through said jacket and exchanger; and a lubricating system including a conduit through which lubricant circulates, said conduit extending through the jacket extension and the circulating cooling medium entering the jacket through said extension.

3. An internal combustion engine having cylinders; a crank case; a crank shaft; means operated during rotation of said crank shaft to cause lubricant in the crank case to be splashed against a wall of the latter parallel to the crank shaft; a cooling system including a cooling jacket about said cylinders, said jacket having an extension disposed opposite said wall, a heat exchanger outside said jacket, and a device for circulating a cooling medium through said jacket and exchanger; and a lubricating system including a conduit through which lubricant circulates, said conduit extending through the jacket extension and said circulating cooling medium entering the jacket through its extension and in alignment with said conduit therein.

4. An internal combustion engine having a crank case; a crank shaft; a splash lubricating system including means responsive to rotation of said crank shaft to cause oil to be thrown against a wall of said crank case progressively at different points longitudinally thereof; a longitudinally extending cooling jacket for said wall having an inlet centrally disposed therein; and means including longitudinally spaced apertures in the cooling jacket for inducing the flow of cooling fluid through said jacket in a direction opposite the direction of travel of the oil along said wall.

5. An internal combustion engine having cylinders; a crank case; a crank shaft; a lubricating system; a cooling jacket about said cylinders, said jacket having an extension provided with an inlet centrally disposed therein; an apertured partition between the jacket and extension and a lubricant cooling system including means operated by rotation of said crank shaft to cause the lubricant to be splashed progressively against longitudinally spaced places on a wall of said jacket extension, a heat exchanger outside said jacket, and means for circulating a cooling medium through said jacket and exchanger so that the circulating medium enters the jacket extension and flows through the latter in a direction opposite the direction of progress of the splashed lubricant and then enters the cooling jacket through the apertured partition.

6. An internal combustion engine having a row of cylinders; a crank case; a crank shaft; a lubricating system; a cooling jacket about said cylinders, said jacket having an extension along one side of the crank case; a longitudinally extending wall having remotely spaced apertures interposed between the jacket and extension, and a lubricant cooling system including means responsive to rotation of said crank shaft to cause the lubricant to be splashed progressively against longitudinally spaced places on a wall of said extension from the opposite ends toward the center thereof, a heat exchanger outside said jacket, and means for circulating a cooling medium through said jacket and exchanger so that the circulating medium enters the jacket extension centrally thereof and is directed to the jacket through said remotely spaced apertures.

7. An internal combustion engine having a row of cylinders; a crank case; a crank shaft; a cooling jacket about said cylinders, said jacket having an extension along one side of the crank case; a lubricating system including a conduit extending part way outside the crank case, and means for delivering lubricant from a supply through said conduit to the working parts of the engine; and a lubricant cooling system including means responsive to rotation of said crank shaft to cause the delivered lubricant to be splashed progressively against longitudinally spaced places on a wall of said extension from the opposite ends toward the center thereof where the lubricant drains into the supply, a heat exchanger outside the crank case, and means for circulating a cooling medium through said jacket and exchanger so that the circulating medium enters the jacket through its extension centrally thereof, the conduit part outside the crank case extending through the extension and being in the path of the cooling medium as it enters said extension.

8. An internal combustion engine having cylinders; a crank case; a cooling jacket about said cylinders, said jacket having an extension with a partition therein and a passage through said partition; a lubricating system; means for splashing the lubricant against a wall of said extension; a heat exchanger outside the crank case; and means for circulating a cooling medium through said jacket and exchanger so that the same enters the jacket through its extension at a point intermediate therein and is caused by said partition to flow along said wall before proceeding to other parts of the jacket.

9. An internal combustion engine having cylinders; a crank case; a cooling jacket about said cylinders, said jacket having a longitudinal extension with a partition therein and a passage through said partition; a lubricating system; means for splashing the lubricant progressively against longitudinally spaced places on a wall of said extension; a heat exchanger outside the crank case; and means for circulating a cooling medium through said jacket and exchanger so that the same enters the jacket through its extension at a point intermediate its ends and is caused by said partition to flow along said wall in a direction opposite the direction of progress of the splashed lubricant before proceeding to other parts of the jacket.

10. An internal combustion engine having a row of cylinders; a crank case; a crank shaft; a lubricating system; a cooling jacket about said cylinders, said jacket having an extension along one side of the crank case, a longitudinal partition in said extension, and passages through said partition at opposite ends thereof; means actuated by rotation of said crank shaft to cause the lubricant to be splashed progressively against longitudinally spaced places on a wall of said extension from the opposite ends toward the center thereof; a heat exchanger outside the crank case; and means for circulating a cooling medium through said jacket and exchanger so that the same enters the jacket through its extension centrally thereof and is caused by said partition to flow along said wall in directions opposite the directions of progress of the splashed lubricant before proceeding to other parts of the jacket.

11. An internal combustion engine having a crank case; a crank shaft; a lubricating system; and a lubricant cooling system including means controlled by rotation of said crank shaft to cause the lubricant to be splashed progressively against longitudinally spaced places on a crank case wall from the opposite ends toward the center thereof, and means including a longitudinally extending wall having remotely spaced apertures therein positioned above an inlet of a cooling medium, said inlet disposed intermediate the ends of said wall for inducing the flow of the cooling medium in heat exchange relation with said wall in directions opposite the directions of progress of the splashed lubricant.

STUART G. BAITS.
DANA K. BADERTSCHER.